(12) United States Patent
Stern et al.

(10) Patent No.: US 7,616,328 B2
(45) Date of Patent: Nov. 10, 2009

(54) METHOD AND SYSTEM FOR PROVIDING A HIGH DEFINITION TRIANGULATION SYSTEM

(75) Inventors: Howard Stern, Greenlawn, NY (US); Mark Krichever, Hauppauge, NY (US); Murray Lawrence, Kings Park, NY (US); James Drannbauer, Bohemia, NY (US)

(73) Assignee: Rudolph Technologies, Inc., Flanders, NJ (US)

( * ) Notice: Subject to any disclaimer, the term of this patent is extended or adjusted under 35 U.S.C. 154(b) by 109 days.

(21) Appl. No.: 11/936,671

(22) Filed: Nov. 7, 2007

(65) Prior Publication Data
US 2008/0165357 A1    Jul. 10, 2008

Related U.S. Application Data

(60) Provisional application No. 60/857,715, filed on Nov. 7, 2006.

(51) Int. Cl.
*G01B 11/14* (2006.01)
(52) U.S. Cl. .................................. 356/623; 356/614
(58) Field of Classification Search ................ 356/625, 356/614, 629–631, 445, 639, 622–623, 503–504, 356/511–515, 521, 601–603, 606–608, 492, 356/495, 497; 250/559.04–559.06, 559.23, 250/559.29, 559.31, 559.48, 559.49, 559.4
See application file for complete search history.

(56) References Cited

U.S. PATENT DOCUMENTS

| 4,238,147 A | 12/1980 | Stern |
| 4,627,734 A | 12/1986 | Rioux |

(Continued)

OTHER PUBLICATIONS

Vodanovic, B., "3D Inspection of bumped wafers in production." Chip Scale Review (Oct. 2005) pp. 45-48.

(Continued)

*Primary Examiner*—Michael A Lyons
*Assistant Examiner*—Tri T Ton
(74) *Attorney, Agent, or Firm*—Dicke, Billig & Czaja, PLLC

(57) ABSTRACT

A triangulation system including a laser beam, optics focusing the laser beam on an object, a light detection unit detecting light reflected from the object due to impingement of the beam on the object, and an arrangement for determining, based on the detected light, object feature dimensions. The wavelength of the laser beam may be shorter than of infrared radiation, which allows for a reduced spot size without significant loss of depth of field. So as to reduce aberrations or a sensitivity to aberrations due to the shortened wavelength, the system may include (i) a polarization dependent coating matching the index of refraction of an element of the light detection unit to that of air for a range of angles, (ii) tilted projection optics, (iii) a prism wavefront corrector, and/or (iv) a positioning assembly, which provides for increased precision in positioning the laser diode with respect to a collimator lens.

33 Claims, 6 Drawing Sheets

U.S. PATENT DOCUMENTS

| | | | |
|---|---|---|---|
| 5,517,349 | A | 5/1996 | Sandstrom |
| 5,554,858 | A | 9/1996 | Costa et al. |
| 5,668,894 | A * | 9/1997 | Hamano et al. ............ 382/242 |
| 5,859,924 | A | 1/1999 | Liu et al. |
| 6,028,671 | A | 2/2000 | Svetkoff |
| 6,031,225 | A | 2/2000 | Stern et al. |
| 6,144,453 | A | 11/2000 | Hallerman et al. |
| 6,262,803 | B1 | 7/2001 | Hallerman et al. |
| 6,291,816 | B1 | 9/2001 | Liu |
| 7,075,662 | B2 | 7/2006 | Hallerman et al. |
| 2005/0057757 | A1 | 3/2005 | Colonna De Lega et al. |
| 2005/0068540 | A1 | 3/2005 | De Groot et al. |

OTHER PUBLICATIONS

Masi, C. G. "Vision system simultaneously checks 2- and 3-D images of wafer bumps and flip-chip substrates," Vision Systems Design (Oct. 2006) at http://vsd.pennnet.com/display_article 274259/19/ARTCL/none/none/Inspection_speeds_wafer_production (pp. 1-5).

A copy of PCT Search Report (mailed Oct. 9, 2008); 12 pgs.

* cited by examiner

METHOD AND SYSTEM FOR PROVIDING A HIGH DEFINITION TRIANGULATION SYSTEM

CROSS-REFERENCE TO RELATED APPLICATION(S)

This application claims priority to U.S. Provisional Application No. 60/857,715, filed Nov. 7, 2006, which is incorporated herein by reference in its entirety.

FIELD OF THE INVENTION

The present invention relates to a high definition triangulation system, and method for its use, adapted to measure or inspect surface features on objects, e.g., by determining the height of different parts of the objects, with higher precision and speed than conventional laser beam scanning triangulation systems.

BACKGROUND INFORMATION

Small features on semiconductor chips, packages, and wafers may be measured or inspected with scanning laser beam triangulation equipment. Such equipment has been previously described in the literature and in patents, such as U.S. Pat. No. 5,859,924, issued to Liu et al., entitled "Method and System for Measuring Object Features," the disclosure of which is incorporated herein in its entirety by reference thereto.

Laser triangulation measuring equipment generally operate by projecting, with a laser beam having a wavelength centered at approximately 830 nm (infrared (IR) radiation), a light spot having a preset spot size onto the surface to be examined, e.g., from a laser projection "gun" that may be mounted normal to the surface being examined. A light detection unit including a lens and a light detecting element or "camera," such as a CCD or CMOS imaging chip or a position sensing device (PSD), e.g., of silicon, at an offset angle to the projection axis may observe the position of the laser spot in its field of view and output a signal describing the angle at which the spot appeared in the field of view. The range to the object can be computed from the angle information when the distance between the laser projection axis and the light detection unit is known. The offset angle between the laser beam and the line of sight of the light detection unit is often referred to as the "triangulation angle." Based on which part of the detector the light reflected from the imaged object impinges, the height or "z-component" of the object at the point at which the light spot impinges upon the object may be determined.

To get high accuracy in the depth or range measurement, it may be required that small changes in depth be discernible on the light detection unit. This may require that the change in angle due to a small change in depth cause a significant change in position of the image of the projected light spot on the light detection unit which, in turn, may require that the magnification between the object and the light detection unit be near unity or greater.

It may be advantageous, particularly when imaging a highly reflective object, that the image of the laser spot be sharply focused on the light detection unit regardless of the height variation of the surface being imaged. This may be accomplished, e.g., by focusing the light detection unit on the projected light beam rather than on the surface to be observed by tilting the lens and the light detecting element with respect to the detection unit's optical axis as is described in U.S. Pat. No. 4,238,147, issued to Stern, entitled "Recording Images of a Three-Dimensional Surface by Focusing on a Plane of Light Irradiating the Surface," the disclosure of which is incorporated herein in its entirety by reference thereto. When the active detecting element is a PSD, it may be required for all reflections of the projected spot from nearby objects be eliminated. This may be made possible by the incorporation of a segmented PSD in the light detection unit as described in U.S. Pat. No. 5,554,858, issued to Costa et al., entitled "Segmented Position Sensing Detector for Reducing Non-Uniformly Distributed Stray Light from a Spot Image," the disclosure of which is incorporated herein in its entirety by reference thereto.

Scanning laser beam triangulation equipment have two basic configurations. In one configuration, the laser beam is scanned in the plane formed by the laser beam and the triangulation angle. See, e.g., U.S. Pat. No. 4,627,734, issued to Rioux. In another configuration, the laser beam is scanned transverse to this plane, which is the most commonly used configuration, as discussed in U.S. Pat. No. 6,031,225, issued to Stern et al., entitled "System and Method for Selective Scanning of an Object or Pattern Including Scan Correction," the disclosure of which is incorporated herein in its entirety by reference thereto. The laser beam may be scanned back and forth at a high speed rate in a sawtooth, triangular, or sinusoidal motion. Typical scan rates are between 4 and 8 kHz with 500 to 1000 points measured during each scan.

In both cases, a motion axis is usually provided that is orthogonal to the laser scan so that data may be gathered over an area of interest rather than just over a single line whose length corresponds to the length of the scan. The mechanical motion of the sensor relative to the object being inspected or measured may be achieved by moving either the sensor or the object along the mechanical axis. When scanning semiconductor parts in a tray, it is most common to physically move the sensor head containing the scanning laser beam triangulation assembly, rather than to move the object. The converse is true when scanning a semiconductor wafer. The laser beam may be scanned, e.g., via a mirror controlled by a galvanometer, via a rotating polygon with mirrored facets, via a chip with multiple micro mirrors as implemented by Texas Instruments and used for television displays, or via an acousto-optic deflector which is the most commonly used device. The acousto-optic deflector makes use of the fact that a fine pitch sinusoidal grating may be used to deflect a light beam and that such a grating may be induced in various transparent crystalline materials by energizing them with an electromechanical transducer that is electrically driven with a radio frequency (RF) voltage. Varying the RF frequency varies the grating pitch inversely. The resulting laser beam deflection is proportional to the RF frequency input to the device. Thus, a linear variation of the RF frequency into the device causes a linear angular deflection of the beam. This type of deflector, currently in wide use in laser scanning systems, has the advantage of not requiring any moving parts, but, when used to obtain large high speed deflections for a focused beam, may suffer from field tilt and curvature and coma due to uneven spot size across the scan due to a "walkoff" phenomena as outlined in U.S. Pat. No. 5,517,349, issued to Sandstrom, entitled "Process and a Device for Error Correction in Acousto-Optic Deflection of Light Beams, Particularly of Laser Light."

In order to avoid shadowing caused by either the laser beam or the camera line of sight being blocked by nearby objects or due to the inspected part being located in a depression such as a shipping tray pocket, it may be necessary to limit the offset angle between the laser beam and the angle of the offset light detection unit. Often, the angle is selected to be between 20 and 30 degrees.

A continuing difficulty with current triangulation sensors used for surface and lead inspection in the semiconductor industry is the need to simultaneously obtain a very small diameter spot for high definition and a large measuring range in depth, or depth of field. This tension exists because improving one of the spot size or depth of field necessarily requires sacrifice of the other, e.g., increasing numerical aperture decreases spot size but greatly decreases depth of field. Conventional triangulation systems provide a lens aperture based on a balance between the need for a small spot size and a large depth of field. Consistently, given the need for a minimum depth of field of 1.5 mm in versatile semiconductor lead scanning equipment, spot size has not been reduced beyond 35 microns. Accordingly, there is a need in the art for a method and system of providing increased precision in triangulation equipment, i.e., smaller spot size, without loss of depth of field.

Another difficulty with current triangulation sensors is the range of optical signals the light detection unit may be required to handle in the case of a highly specular target object being imaged. For example, because solder balls are very shiny, depending on the slope of the portion of the solder ball that is illuminated by the laser beam, light from the impinging laser beam may be reflected from a solder ball directly away from the detection unit's optics (so that the detection unit receives almost no signal from which to detect the z component) or directly towards the detection unit's optics (so that the signal is so strong that it may damage the detection unit). The very small and very large signals associated with the variation in slope may create a requirement for handling a very large dynamic range of signals compared to that needed for a diffuse object. Accordingly, there is a need in the art for a method and system of reducing the dynamic range of optical signals that the light detection unit might be required to handle.

SUMMARY

An exemplary embodiment of the present invention provides for improvement in a scanning beam laser triangulation system that is optimized for scanning semiconductor packages and wafers.

An exemplary embodiment of the present invention relates to a method and system for determining with great precision the dimensions of a device's leads or of external connections used to connect the device to circuit boards, connectors, or other intermediate assemblies, e.g., in the semiconductor industry in which the dimensions of such features are bound by tight tolerances.

An exemplary embodiment of the present invention provides for triangulation equipment that produce a light spot that has a spot size smaller than that produced by conventional triangulation equipment, in particular without losing any or a significant amount of depth of field.

An exemplary embodiment of the present invention provides for triangulation equipment that produces a laser having a wavelength shorter than that a laser of conventional triangulation equipment.

An exemplary embodiment of the present invention provides for a light detection unit of a triangulation system that has a complex coating of two materials that is deposited in at least two layers and that may be optimized for a particular polarization. The polarization may be one particular to elements provided for converting a circular light polarization received from the imaged object to a linear polarization before the light strikes the light detecting element(s).

An exemplary embodiment of the present invention provides a reliable scanning laser beam triangulation system capable of scanning smaller objects (by implementing the smaller spot size) over a greater depth of field than is currently possible by such a reduction in spot size. To improve the scanning laser beam's depth of field vs. resolution trade-off, exemplary embodiments of the present invention provide for implementing a laser beam having a wavelength shorter than that of conventionally implemented laser beams to reduce the spot size, instead of reducing the ratio of the focal distance of a laser projection lens to the aperture, and provide for offsetting or eliminating problems arising from the reduction of the wavelength and from the resulting reduction of the spot size.

Irrespective of spot size, a reduced wavelength may be used for an additional benefit, to reduce the dynamic range of optical signals that the light detection unit might be required to handle in the case of a highly specular object. An exemplary embodiment of the present invention implements a laser beam having a wavelength shorter than that of conventionally implemented laser beams to increase the ratio of surface irregularities of the imaged object to the wavelength so that the object surface appears more diffuse (or less specular).

Reduction of wavelength may cause increased difficulty in detecting the light properly, so that use of shorter wavelengths has been avoided in conventional triangulation systems because of reduced performance of the light detection unit. The increased difficulty lies in the following. The requirement that the detection unit magnification be near unity or greater and that a narrow triangulation angle of 20 to 30 degrees be chosen to avoid shadowing leads to difficulty in both properly focusing the light onto the surface of the light detection unit and having the light be absorbed rather than reflected. This is because light at a near grazing angle tends to reflect from the surface of the light detection unit rather than be absorbed by it as is desired. Often, the silicon detecting element has a greater responsiveness (electrical output per unit light input) when a laser beam having a longer wavelength is used than when a laser beam having a shorter wavelength is used. Furthermore, when a PSD is used as the light detection unit light from such reflections may be reflected back to and upon the PSD surface by nearby wire bonds or other elements internal to the PSD package, which, due to the nature of the PSD, can lead to erroneous depth measurement because the PSD cannot differentiate between the original light received and light received via secondary reflections. Therefore, reflections from the surface of the light detection unit, e.g., the PSD, need to be greatly reduced or eliminated where the light detecting element has reduced responsiveness.

Exemplary embodiments of the present invention overcome this difficulty by providing for an optimized anti-reflection coating that matches both the laser wavelength used in the scanning system and the steep incidence angle at which the image is focused on the detector. In one example embodiment, the coating may be customized for a particular polarization. The coating may match the optical index of air to the optical index of silicon for the range of angles and wavelength of the light approaching the detector. This matching may increase the absorption of the light signals by the light detecting elements, thereby allowing implementation of the shorter wavelengths.

Use of a smaller than conventional spot size and/or of a shorter than conventional wavelength have been avoided in conventional triangulation systems for an additional reason. The smaller the produced spot size, the more important it may be for the laser diode producing the laser beam to be positioned optimally with respect to a collimator that collimates the laser beam. Absence such optimal positioning, the collimated laser beam may have various optical aberrations and might not focus to a small compact spot. Further, the shorter the wavelength, the more precise the necessary required positioning might be. For example, with respect to the collimator axis, if the laser diode is more than a ¼ wavelength from the proper spot with respect to the collimator lens, the beam might not be properly collimated. These are additional reasons that use of a smaller than conventional spot size and/or of a shorter than conventional wavelength have been avoided in conventional triangulation systems.

Exemplary embodiments of the present invention address these problems and, thus, allow for the use of smaller point size without a significant sacrifice of depth of field. In an example embodiment of the present invention, a positioning assembly for positioning the laser diode with respect to the collimator lens may be configured to allow for precise adjustment of the two elements with respect to each other in the X, Y, and Z axes. With respect to the Z axis (axially with respect to the collimator axis), the laser diode may be adjusted in order to get the proper focus. Further, with respect to the X and Y axes, the assembly may allow for adjustment so that the beam is centered with respect to the center of the lens (the lens axis). Absent such positional assembly, the beam may leave in an off axis direction and suffer from various aberrations such as coma.

An additional reason that reduction in spot size may have been avoided in the prior art systems is that reduction in spot size may cause an increased sensitivity to aberrations that cause field tilt and curvature. In one exemplary embodiment of the present invention, the triangulation system may include tilted projection optics or a prism wavefront corrector to reduce tilt and field curvature induced by the acousto-optic deflector in the focused scanned spots.

Thus, as detailed below in equation (2), to reduce spot size (for higher definition), one can either reduce wavelength or reduce F#. Reduction of spot size by reducing F# may be problematic, since depth of field is typically thereby also reduced, even more so (as is explained below) than in response to a similar reduction in wavelength. Nevertheless, between the two, one would be more inclined to reduce F# than wavelength, because reduction of wavelength results in increased error when analyzing signals obtained by light reflected from any part of an inspected object. In particular, reduction of wavelength (i) has a negative effect on the responsiveness of the light detecting elements due to reduction in absorption of signal and increase in receipt of re-reflected secondary light signals, (ii) requires more precision than can be provided by conventional systems in positioning the laser diode with respect to the collimator lens, and (iii) results in an increased sensitivity to aberrations that cause field tilt and curvature. The problems associated with the lack of detector responsiveness and increased sensitivity to aberrations would lead one to reduce F# instead of wavelength for reducing spot size. Notwithstanding the above, a system and method in accordance with an example embodiment of the present invention uses a reduced wavelength (as opposed to reduce F#) to improve the laser beam's depth of field vs. resolution trade-off and to offset the known disadvantages inherent in reducing wavelength by, for example, incorporating (a) an anti-reflective coating, to mitigate the detector responsiveness problem, (b) positioning elements that allow for precise and independent positioning of the laser diode with respect to the collimator lens in each of three dimensions, and (c) tilted projection optics or a prism wavefront corrector to decrease sensitivity to aberrations.

According to an exemplary embodiment of the present invention, a method for detecting features of a target object using a triangulation system, such as a laser beam scanning triangulation system, provides for: producing radiation, such as a laser beam, having a wavelength shorter than that of infrared radiation; focusing the radiation on an object; detecting radiation reflected from the object due to impingement of the radiation on the object; and, based on the detecting, determining at least one dimension of at least one feature of the object.

In an exemplary embodiment of the method, the method further provides for: matching an optical index of refraction of a radiation detecting element, such as a light detecting element, to an optical index of refraction of air, the matching being customized for a range of angles at which radiation reflected from the object approaches the radiation detecting element and for the wavelength of the radiation.

In one example embodiment of the method, the radiation detecting element includes silicon material.

In one example embodiment of the method, the radiation detecting element is made of silicon material.

In one example embodiment of the method, the matching is performed by coating the radiation detecting element with a coating that includes at least two materials and/or at least two layers.

In one example embodiment of the method, the coating may be matched to a particular polarization of the radiation.

In one example embodiment of the method, the particular polarization may be one caused by passing of the reflected radiation through a filter that prevents indirectly reflected radiation from passing through the filter to the light detecting element.

In an exemplary embodiment of the method, the method further provides for: incorporating in the triangulation system a corrective component, such as tilted projection optics and/or a prism wavefront corrector, adapted to reduce aberrations that cause field tilt and curvature.

In an exemplary embodiment of the method, the impinging radiation produces a spot size sufficiently small so as to result in: (a) aberrations that cause a field tilt and curvature, which skews analysis by the triangulation system; and (b) a sensitivity to such aberrations, and the method further provides for: at least one of incorporating in the triangulation system a component, e.g., at least one of tilted projection optics and a prism wavefront corrector, adapted to reduce the aberrations.

In an exemplary embodiment of the method, the method further provides for positioning the radiation source in at least one of three dimensions and securing the radiation source in place.

In an exemplary embodiment of the method, a laser diode is used as a source of the radiation, and the method further provides for: precisely positioning the laser diode with respect to a collimator lens in each of three dimensions independently.

In an exemplary embodiment of the method, the preciseness of the positioning in each of the dimensions is at least to within 2.2 microns.

In an exemplary embodiment of the method, the preciseness of the positioning in at least one of the dimensions is at least to within 0.75 microns.

In an exemplary embodiment of the method, the positioning of the laser diode in each dimension is performed by screwing a corresponding threaded part in a direction that is opposed to a biasing direction of a corresponding biasing element.

In an exemplary embodiment of the method, a first one of the threaded parts is threadably inserted into a collimator adjustment tube for moving the collimator lens against a first one of the biasing elements along the collimator lens' axis, and each of a second one and a third one of the threaded parts is threadably inserted into a laser diode holder plate for moving the laser diode transverse to the movement of the collimator lens and against corresponding biasing elements, the two transverse movements being orthogonal to each other.

In an exemplary embodiment of the method, the method further provides for: fixing a protection sleeve over the first threaded part after completion of the movement of the collimator lens along the collimator lens' axis to guard against inadvertent movement of the collimator lens along the collimator lens' axis.

In an exemplary embodiment of the method, the positioning of the laser diode in each of at least two dimensions is performed by repeated screwing and loosening of each of a pair of opposing threaded parts corresponding to the dimension.

According to an exemplary embodiment of the present invention, a method for detecting features of a target object using a laser beam scanning triangulation system provides for: providing in the triangulation system a laser diode that produces a laser beam having a wavelength shorter than infrared radiation wavelengths, the laser beam impinging upon the object; and using the triangulation system to detect surface features of the object based on the impingement of the laser beam on the object.

According to an exemplary embodiment of the present invention, a method for providing a limited range of signals to be handled by a light detecting unit of a laser beam triangulation system used to inspect a highly specular object provides for: producing a laser beam having a wavelength shorter than infrared radiation wavelengths; and focusing the laser beam to impinge on the object, the impinged light being reflected to the light detecting unit.

According to an exemplary embodiment of the present invention, a method for detecting features of a target object using a triangulation system, such as a laser beam scanning triangulation system, provides for: producing a laser beam having a wavelength less than that of IR radiation; focusing the laser beam on an object; detecting radiation reflected from the object due to impingement of the laser beam on the object; based on the detecting, determining at least one dimension of at least one feature of the object; using the laser beam to produce a spot size, e.g., by configuring optics of the triangulation system, that is equivalent to one produced by a different laser beam having an approximately IR radiation wavelength by increasing an F# of the optics (as opposed to decreasing the wavelength of the radiation).

With respect to each of the above methods, in an exemplary embodiment of the method, the wavelength is shorter than 830 nm.

With respect to each of the above methods, in an exemplary embodiment of the method, the wavelength is centered in a range of 380 to 660 nm.

With respect to each of the above methods, in an exemplary embodiment of the method, the wavelength is centered in a range of 380 to 570 nm.

With respect to each of the above methods, in an exemplary embodiment of the method, the wavelength is centered at 535 nm.

With respect to each of the above methods, in an exemplary embodiment of the method, the wavelength corresponds to that of visible light.

With respect to each of the above methods, in an exemplary embodiment of the method, the wavelength corresponds to at least one of red light, green light, blue light, and violet light.

With respect to each of the above methods, in an exemplary embodiment of the method, the wavelength is shorter than that of visible light.

According to an exemplary embodiment of the present invention, a triangulation method, such as a radiation beam scanning triangulation method, provides for: producing a radiation beam; focusing the radiation on an object; reducing aberrations that cause field tilt and curvature, for example, via a corrective component, e.g., at least one of tilted projection optics and a prism wavefront corrector; detecting radiation reflected from the object due to impingement of the radiation beam on the object; and determining, based on the detected radiation, at least one dimension of at least one feature of the object.

According to an exemplary embodiment of the present invention, a triangulation system, such as a scanning laser beam triangulation system, includes: a laser diode that produces a laser beam having a wavelength shorter than that of infrared radiation; optics for focusing the laser beam on an object; a radiation detection unit for detecting radiation reflected from the object due to impingement of the laser beam on the object; and an arrangement, such as a processor, for determining, based on the detected light, at least one dimension of at least one feature of the object.

In an exemplary embodiment of the system, the wavelength is shorter than 830 nm.

In an exemplary embodiment of the system, the wavelength is centered in a range of 380 to 660 nm.

In an exemplary embodiment of the system, the wavelength is centered in a range of 380 to 570 nm.

In an exemplary embodiment of the system, the wavelength is centered at 535 nm.

In an exemplary embodiment of the system, the wavelength corresponds to that of visible light.

In an exemplary embodiment of the system, the wavelength corresponds to one of red light, green light, blue light, and violet light.

In an exemplary embodiment of the system, the wavelength is shorter than that of visible light.

In an exemplary embodiment of the system, the system further includes: a coating positioned on a detecting element of the light detection unit adapted to match an optical index of refraction of the radiation detecting element to an optical index of refraction of air, the matching being customized for a range of angles at which the radiation reflected from the object can approach the radiation detecting element and for the wavelength of the laser beam.

In an exemplary embodiment of the system, the light detecting element includes silicon material.

In an exemplary embodiment of the system, the light detecting element is made of silicon material.

In an exemplary embodiment of the system, the coating includes at least two materials and at least two layers.

In an exemplary embodiment of the system, the optics include corrective components, e.g., at least one of tilted projection optics and a prism wavefront corrector, adapted to reduce aberrations that cause field tilt and curvature.

In an exemplary embodiment of the system, the impinging radiation produces a spot size sufficiently small spot size is sufficiently small so as to result in at least one of: (a) aberrations that cause a field tilt and curvature, which skews analysis by the arrangement for determining the dimensions; and (b) a sensitivity to such aberrations, and the optics include a corrective component, e.g., at least one of tilted projection optics and a prism wavefront corrector, adapted to reduce the aberrations.

In an exemplary embodiment of the system, the system further includes a component adapted to position the radiation source in at least one dimension and to secure the radiation source in place relative to the object.

In an exemplary embodiment of the system, the system further includes: a collimator lens for collimating the laser beam produced by the laser diode; and an assembly for fixing the laser diode and the collimator lens in a relative position, where the assembly includes a laser diode holder plate for holding the laser diode; a collimator adjustment tube for holding the collimator lens; and, for each of three dimensions, at least one corresponding positioning element, the positioning elements allowing for precise positioning of the laser diode with respect to the collimator lens in each of the three dimensions independently.

In an exemplary embodiment of the system, the preciseness of the positioning in each of the dimensions is at least to within 2.2 microns.

In an exemplary embodiment of the system, the preciseness of the positioning in at least one of the dimensions is at least to within 0.75 microns.

In an exemplary embodiment of the system, the preciseness of the positioning along the collimator lens' axis is at least to within 0.75 microns.

In an exemplary embodiment of the method, the at least one corresponding positioning element of each of at least two of the dimensions includes a pair of opposing threaded parts. The positioning in each of the at least two dimensions may be performed by repeated screwing and loosening of each of the pair of opposing threaded parts.

In an exemplary embodiment of the system, the at least one corresponding positioning element of each dimension includes a threaded part and a biasing element. The positioning in each dimension may be performed by screwing the dimension's corresponding threaded part in a direction that is opposed to a biasing direction of the dimension's corresponding biasing element.

In an exemplary embodiment of the system, a first one of the threaded parts is configured for threadable insertion into the collimator adjustment tube for moving the collimator lens against a first one of the biasing elements along the collimator lens' axis, and each of a second one and a third one of the threaded parts is configured for threadable insertion into the laser diode holder plate for moving the laser diode transverse to the movement of the collimator lens and against corresponding biasing elements, the two transverse movements being orthogonal to each other. In one example embodiment of the system, the system further includes: a protection sleeve configured to be coupled to the collimator adjustment tube and to cover the first threaded part after completion of the movement of the collimator lens along the collimator lens' axis to guard against inadvertent movement of the collimator lens along the collimator lens' axis.

According to an exemplary embodiment of the present invention, a triangulation system, such as a scanning radiation beam triangulation system, includes: a radiation source that produces a beam of radiation; optics for focusing the radiation beam on an object, the optics including at least one of tilted projection optics and a prism wavefront corrector adapted to reduce aberrations that cause a field tilt and curvature; a radiation detection unit for detecting radiation reflected from the object due to impingement of the radiation beam on the object; and an arrangement, e.g., a processor, for determining, based on the detected radiation, at least one dimension of at least one feature of the object.

According to an example embodiment of the present invention, a scanning laser beam triangulation system may include: a laser diode that produces a laser beam having a wavelength that one of (a) is centered one of (i) in a range of 380 to 570 nm and (ii) at 535 nm, (b) corresponds to one of green light, blue light, and violet light, and (c) is shorter than that of visible light; an optics assembly for focusing the laser beam on an object, the optics assembly including a collimator lens for collimating the laser beam, an acousto-optic deflector for deflecting the laser beam, and at least one of tilted projection optics and a prism wavefront corrector; a positioning assembly for fixing the laser diode and the collimator lens in a relative position; a light detection unit for detecting light reflected from the object due to impingement of the laser beam on the object; a coating positioned on a silicon detecting element of the light detection unit adapted to match an optical index of refraction of the light detecting element to an optical index of refraction of air, the matching being customized for a range of angles at which the light reflected from the object can approach the light detecting element and for the wavelength of the laser beam; and a processor for determining, based on the detected light, at least one dimension of at least one feature of the object.

According to this embodiment, the coating may include two layers, the two layers being made of two different materials, a first one of the materials having a high index of refraction and a second one of the materials having a low index of refraction.

Further, according to this embodiment, the laser beam may produce a spot size that is smaller than 35 microns and that, because of its small size, results in at least one of (a) aberrations that cause a field tilt and curvature and (b) a sensitivity to such aberrations, which skews analysis by the processor. The at least one of the tilted projection optics and the prism wavefront corrector may be adapted to reduce the aberrations.

Further, according to this embodiment, a depth of field of the laser beam may be at least 1.5 mm.

Further, according to this embodiment, the positioning assembly may include: a laser diode holder plate for holding the laser diode; a collimator adjustment tube for holding the collimator lens; for each of three dimensions, at least one corresponding positioning element, the positioning elements allowing for precise positioning of the laser diode with respect to the collimator lens in each of the three dimensions independently, the preciseness of the positioning in the dimension along the collimator lens' axis being at least to within 0.75 microns, and the preciseness of the positioning in the other two dimensions being to within 2.2 microns; a protection sleeve; and a biasing element for biasing the laser diode holder plate in a direction towards the collimator lens.

Further, according to this embodiment, the at least one corresponding positioning element of each dimension may include a pair of opposing parts, where one of: (I) the pair of opposing parts of each dimension includes a threaded part and a biasing element, the positioning in each dimension being performed by screwing the dimension's corresponding threaded part in a direction that is opposed to a biasing direction of the dimension's corresponding biasing element; and (II) the pair of opposing parts of a first dimension includes the threaded part and the biasing part of (I), and the pair of opposing parts of each of the remaining dimensions is a pair of opposing threaded parts, the positioning in each of the dimensions for which the pair of opposing threaded parts are used being performed by repeated screwing and loosening of each of the pair of opposing threaded parts. A threaded part of a first one of the dimensions may be configured for threadable insertion into the collimator adjustment tube for moving the collimator lens against a biasing element of the dimension along the collimator lens' axis, and each of a threaded part of a second one of the dimensions and a threaded part of a third one of the dimensions may be configured for threadable insertion into the laser diode holder plate for moving the laser diode transverse to the movement of the collimator lens and against corresponding opposing parts, the two transverse movements being orthogonal to each other. The protection sleeve may be configured to be coupled to the collimator adjustment tube and to cover the threaded part of the first dimension after completion of the movement of the collimator lens along the collimator lens' axis to guard against inadvertent movement of the collimator lens along the collimator lens' axis.

DETAILED DESCRIPTION OF EXAMPLE EMBODIMENTS

Figure 1:
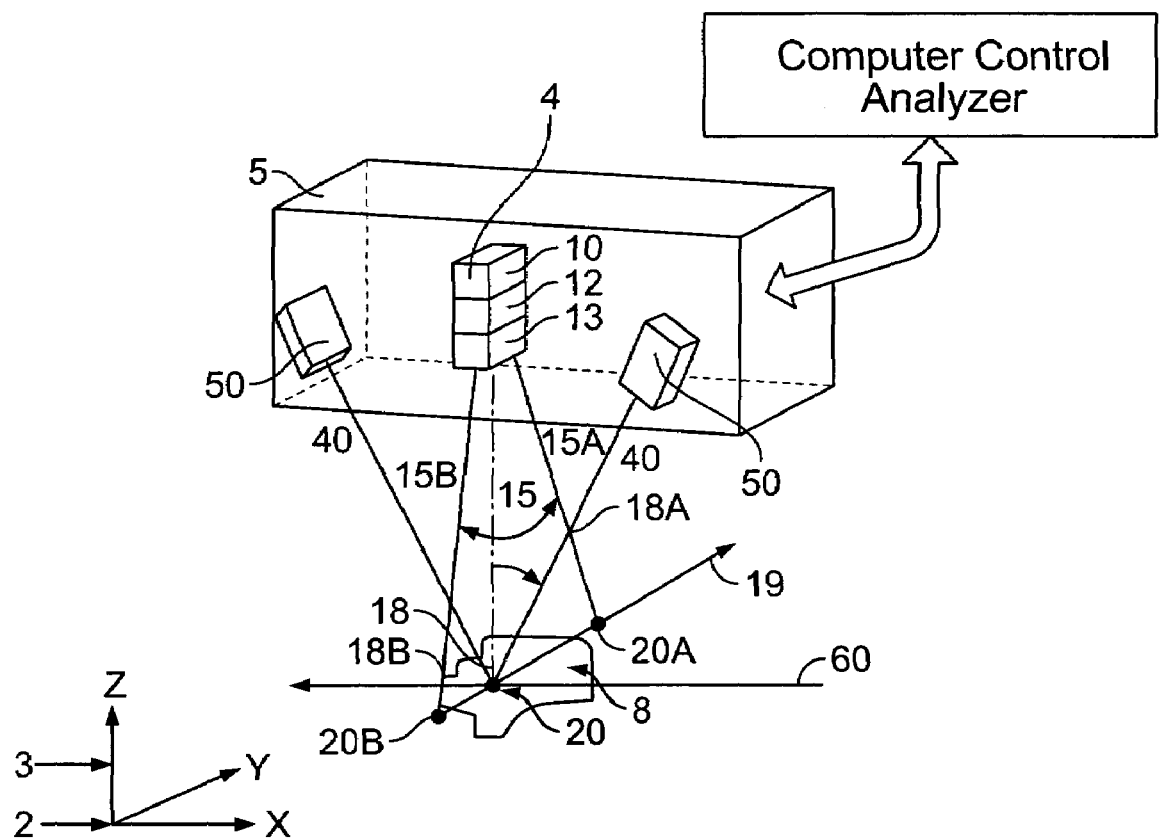
FIG. 1 is a schematic representation of a scanning laser beam triangulation system, according to an example embodiment of the present invention.

FIG. 1 is a schematic view of a 3-D data gathering portion of a scanning laser beam triangulation system, according to an example embodiment of the present invention, used, for example, to measure and inspect wafers and semiconductor devices. Although such systems often are capable of gathering 2-D data as is outlined in U.S. Pat. No. 6,291,816, issued to Liu, entitled "System and Method for Measuring Object Features with Coordinated Two and Three Dimensional imaging," the disclosure of which is incorporated herein in its entirety by reference thereto, and in U.S. Pat. No. 5,859,924, issued to Liu et al., entitled "Method and System for Measuring Object Features," the disclosure of which is incorporated herein in its entirety by reference thereto, the 2-D portion of the system is not described herein for the sake of clarity.

A scanning head 5 may be arranged to gather surface data from an object 8 at a nominal height 2 along the Z axis. The scanning head 5 may contain one or more, e.g., two, detection units 50 and a laser beam projection assembly 4. The laser beam projection assembly 4 may include an acousto-optic deflector 12, projection optics 13, and a laser 10 whose wavelength is centered at a wavelength, e.g., of approximately 380 to 660 nm, 380 to 570 nm, or 535 nm. These wavelengths are shorter than conventionally implemented wavelengths, which are at near IR wavelengths. The acousto-optic deflector is only one exemplary embodiment of a device for scanning. Other devices may include, e.g., a mirror controlled by a galvanometer, a rotating polygon with mirrored facets, or a chip with multiple micro mirrors as implemented by Texas Instruments and used for television displays.

The detection units 50 may be offset from the laser projection assembly 4 along the X axis and may have viewing axes that intersect the laser beam 15 at point 20. The laser beam 15 may be scanned, e.g., by the acousto-optic deflector 12, in the Y-Z plane between its extreme positions of 15A and 15B. The laser beam 15 is shown impinging the object 8 (target) at the nominal height 2 at point 20 which lies on the scan axis 19 which is parallel to the Y axis. At the extremes of its scan, 15A and 15B, the laser beam 15 is shown striking the object at points 20A and 20B at a nominal height 2 with respect to the Z axis. Were the object raised to a different height 3 with respect to the Z axis, the laser beam 15 would strike the object at points 18A and 18B that correspond to the laser beam positions of 15A and 15B, respectively. The range of heights between 18 and 20 may be all those within the depth of field. The focal planes of the detection units may be focused on the plane defined by the points 18A, 18B, 20A and 20B. Although the sensor head 4 is shown using a vertical laser beam 15 and two detection units 50, the laser beam 15 may strike the object 8 obliquely and one or more detection units 50 may be used. In such systems the laser and detection unit are often arranged symmetrically so that the laser beam 15 is reflected from a horizontal object surface 8 towards the detection unit 50. In such systems, the laser beam projection assembly 4 would, for instance, replace one of the detection units 50 in FIG. 1 and maintain the same axis 40.

A motion axis 60 is shown that is parallel to the X axis. Relative motion between the scanning head 5 and the object 8 may translate the scan axis in a direction parallel to the X axis so that the laser beam scans an area defined by the product of the length of the scan, nominally between points 20A and 20B, multiplied by the distance moved along the motion axis 60. To achieve relative translation between the scanning head 5 and the object 8 along the motion axis 60, the object 8 may be translated, e.g., a wafer may be translated when inspecting balls on the wafer, or the scanning head 5 may be translated, e.g., when inspecting semiconductor parts in trays.

Figure 6:
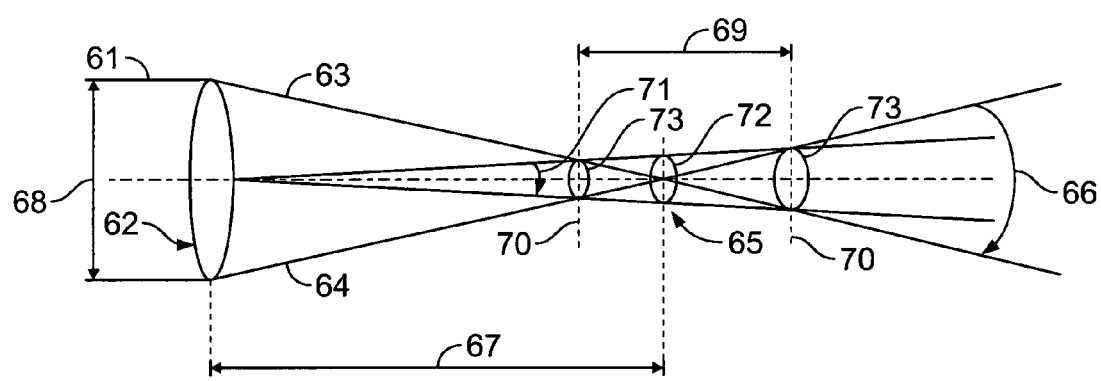
FIG. 6 schematically illustrates the interdependency of projected spot size and depth of field.

FIG. 6 is a simplified schematic of the light rays leaving the projection assembly 4 shown in FIG. 1. Approximately parallel light rays 61 from the acousto-optic deflector 12 located within the projection assembly 4 may enter a projection lens 62 that has focal length 67, and may exit in a beam of diameter 68 (or aperture 68). The rays may focus at point 65 which is one focal length away with a rough depth of field 69 that corresponds to the distance over which the geometric defocus and the diffraction spot sizes are approximately equal, e.g., the distance between points labeled 70. At points 70, the size of blur spots 73 due to geometric defocus approximately equal a diffraction spot size 72. Projection lens 62 may include orthogonal cylindrical lenses (corresponding to lenses 110 and 114 of FIG. 2) that have the same diffraction spot size and geometric defocus characteristics. Although the exact values of beam diameter and depth of field are a function of the exact beam intensity across the aperture 68, the beam diameter and depth of field may be approximated based on the following:

The spot size 72 due to diffraction may be computed as:

$$\text{Spot size } 72 = 2 * \text{wavelength} * \text{distance} 67 / \text{aperture} 68 \quad \text{(eq. 1)}.$$

The term (distance 67)/(aperture 68) is the apparent F#. Therefore, (eq. 1) may be restated as:

$$\text{Spot size } 72 = 2 * \text{wavelength} * F\# \quad \text{(eq. 2)}.$$

As can be gleaned from the illustration in FIG. 6, this spot size depends at least in part on a diffraction angle 71.

Based on the triangle formed by the focal point 65 and the limiting rays 63 and 64 of the lens, and based on the aperture height 68, the geometric blur size for any distance 69 about the focal point can be computed when angle 71 is small compared to angle 66, which is normally the case. In this regard, the geometric blur size can be computed as:

$$\text{Blur size } 73 = \tfrac{1}{2} * (\text{distance } 69) * (\text{aperture } 68) / (\text{distance } 67) \quad \text{(eq. 3)},$$

which again can be reduced to:

$$\text{Blur size } 73 = \tfrac{1}{2} * (\text{distance } 69) * 1/F\# \quad \text{(eq. 4)};$$

or $$\text{Blur size } 73 = \tfrac{1}{2} * (\text{distance } 69)/F\# \quad \text{(eq. 5)},$$

by noting that (distance 67)/(aperture 68) is the apparent F#.

To find the depth of field, the geometric blur size 73 used in the equations may be that which approximates the diffraction spot 72. Thus, the spot size 72 may be equated to the blur size 73, as follows:

$$\text{Blur size } 73 = \text{Spot Size } 72 = *(\text{distance } 69)/F\# \quad \text{(eq. 6)}.$$

This may be restated to solve for the distance 69, i.e., the depth of field, as follows:

$$\text{Depth of field} = \text{distance } 69 = 2 * (\text{Spot size } 72) * F\# \quad \text{(eq. 7)}.$$

Based on eq. 2, the following equation may be used to solve for F#:

$$F\# = (\text{Spot size } 72)/(2 * \text{wavelength}) \quad \text{(eq. 8)}.$$

Substituting the term "F#" of eq. 7 with eq. 8, the depth of field may be expressed as:

$$\text{Depth of field} = 2 * (\text{Spot size } 72) * (\text{Spot size } 72)/(2 * \text{wavelength}) \quad \text{(eq. 9)}.$$

Eq. 9 may be restated as:

$$\text{Depth of field} = (\text{Spot size } 72)^2/\text{wavelength} \quad \text{(eq. 10)}.$$

Thus, increased depth of field for a given spot size can be obtained by reducing the wavelength of the laser. While reduction of wavelength would reduce the spot size, the spot size may be maintained by adjusting the F# to offset the reduction caused by the wavelength.

Reduction of the spot size by shortening the laser wavelength (e.g., where the F# is not changed to maintain the spot size) reduces depth of field by less than would a reduction of the spot size by decreasing the F#. This is true because while reducing the F# reduces only the numerator of eq. 10, reducing the wavelength reduces both the numerator and the denominator of eq. 10. That is, adjustment of the wavelength, as opposed to the F#, improves the scanning laser beam's depth of field vs. resolution trade-off.

Accordingly, in an exemplary embodiment of the present invention, improved equipment performance may be obtained by using a shorter than conventional wavelength to provide a smaller than conventional spot size. For example, in an exemplary embodiment of the present invention, visible light wavelengths, rather than an approximately near IR wavelength, may be used. For example, a red light laser may be used, but this is so close to a near IR wavelength that only a small improvement will be achieved. While some errors introduced as a result of implementing a shorter wavelength, for which solutions are provided below, might not be so egregious for high order visible light, such as red, the errors are further aggravated when moving down the color spectrum to even lower order visible light (or light below visible light). Nevertheless, in an example embodiment of the present invention, even lower order light, such as green, blue, or violet light laser may be used. In fact, these lower order light wavelengths may be ideal. In particular, a laser may be used that has a wavelength in the range of approximately 380 to 570 nm. With respect to depth of field, wavelengths of even below 380 nm may be used according to exemplary embodiments of the present invention, except that limitations of currently used lenses and laser assemblies may render wavelengths below 380 nm sub-optimal.

In an example embodiment of the present invention, a shorter than conventional wavelength, such as one in the range discussed above, may be implemented to reduce the dynamic range of the amplitude of the optical signals the detector might be required to handle. Because solder balls are very shiny, light from the impinging laser beam 15 (FIG. 1), may at times be reflected from a solder ball directly away from or directly towards the optics of the detection units 50, depending on the slope of the portion of the ball being illuminated by the laser beam. The very small and very large signals associated with the variation in slope for the two aforementioned cases, respectively, may create the requirement for handling a very large dynamic range compared to that needed when a more diffuse object is scanned. That is, in comparison to the shiny surfaced object, when a diffuse object is scanned, it may create little variation in signal with variations in surface slope. The shininess of the ball is a function of the smoothness of its surface. As the surface dimensions of the surface irregularities on a solder ball, or any surface, become larger than approximately ¼ the wavelength of the illuminating beam the surface appears to be less specular (shiny) and more diffuse. Therefore, in an exemplary embodiment of the present invention, the laser beam wavelength may be shorter than conventional wavelengths so that surface irregularities may be large compared to the new wavelength and so that the object surface thereby appears to be (and has the corresponding properties) less shiny and therefore more diffuse.

Figure 2:
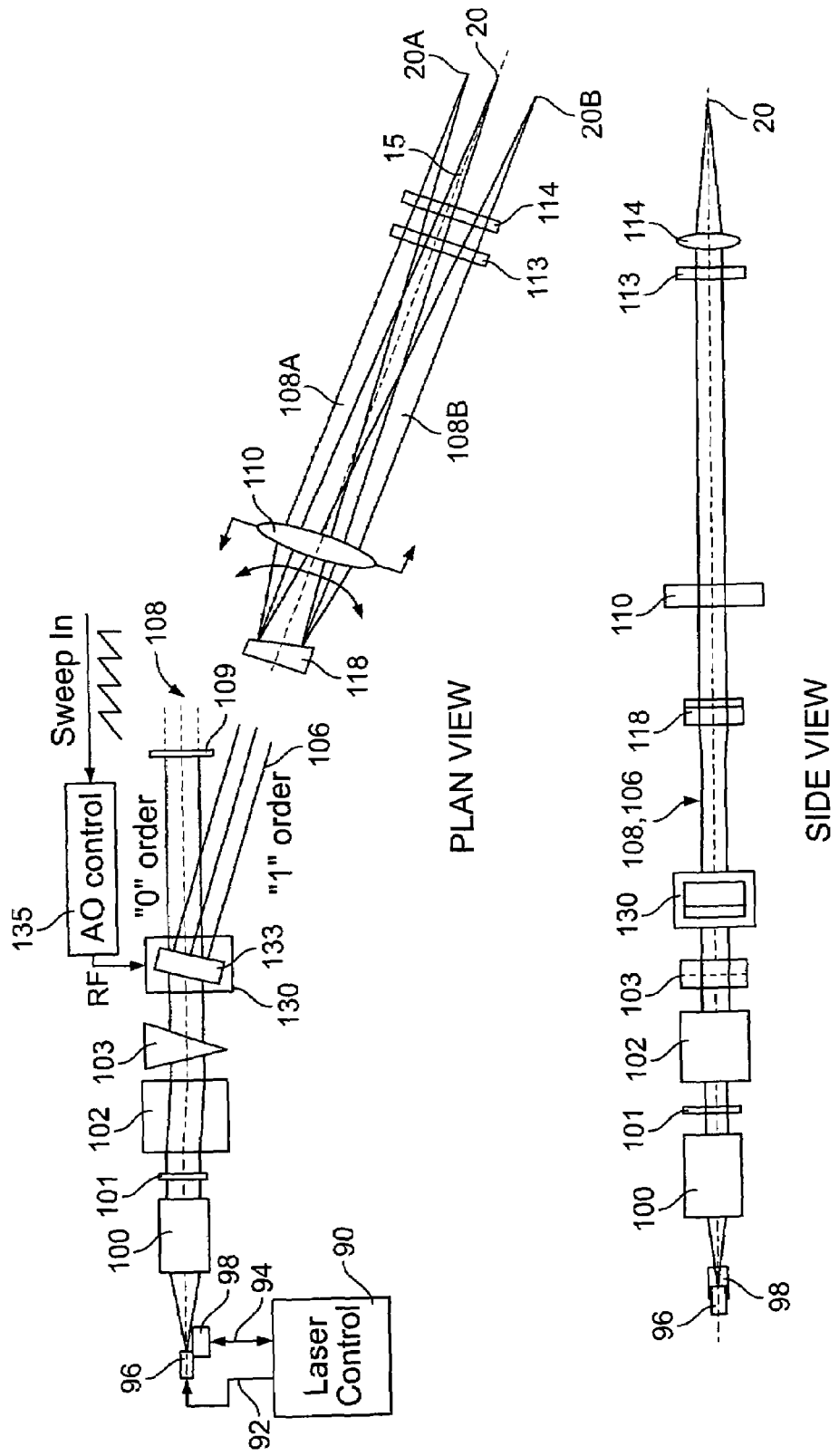
FIG. 2 is a schematic representation of the plan and side views of a laser scanner assembly of the scanning laser beam triangulation system of FIG. 1 using acousto-optic deflection that illustrates the elements that enable more precise scanning over a greater depth of field, according to an example embodiment of the present invention.

FIG. 2 schematically shows the optical layout of the laser scanning assembly in both plan and side views to illustrate cylindrical lens components and prismatic elements. To obtain the benefits of a reduced spot size and the better depth of field provided by reducing the laser wavelength from the near IR to the shorter visible wavelengths, it is also required to simultaneously reduce field curvature and other optical aberrations to which the system becomes more sensitive due to the smaller spot size. Reducing optical aberrations becomes more difficult as the spot size shrinks (regardless of whether a larger numerical aperture (smaller F#) is employed). Exemplary embodiments of the present invention may include features to offset the increased aberrations or sensitivity to aberrations introduced by reduction of the spot size, as is explained below.

In FIG. 2, the laser energy is supplied by laser diode 96. Various laser diodes of short, e.g., visible wavelengths, such as those corresponding to the colors green or blue, for example, those that are used for recording and reading data in Blu-ray™ or other similar DVD players, can be used. Alternative types of lasers may be used in place of the laser diode. An example of an applicable alternative is the frequency doubled Nd:YAG (Neodymium Doped Yttrium Aluminum Garnet) laser in which the output of the laser is doubled in a non-linear crystal to produce a green laser beam at 535 nm. Whatever type laser is used, the laser may be single mode and have a stable single wavelength output to avoid the formation of widened or multiple output beams after passage through an acousto-optic deflector 130 whose deflection is proportional to the wavelength of the light passing through it.

Where the laser beam is scanned using an acousto-optical deflector, since the acousto-optical deflector may be sensitive to variations in wavelength, it may be necessary to control the laser diode 96 temperature using closed loop control implemented via laser diode control circuit 90 and laser diode mounting block 98 that contains a thermistor temperature monitor and Peltier effect module that can add heat to or subtract heat from the laser diode 96. The laser diode control circuit 90 may receive an electrical voltage indicative of the current laser diode 96 temperature and may send a positive or negative voltage back to the diode mounting block 98 to maintain the desired temperature. The laser diode control circuit 90 may also have an output 92 that supplies the current to laser diode 96.

In one example embodiment, laser diode 96 may emit linearly polarized light and radiate in an elliptical pattern. The light expanding in the direction of the long axis of the ellipse is traced in the plan view of FIG. 2 and the light expanding in the narrow direction of the ellipse is traced in the side view of FIG. 2. Laser light leaving laser diode 96 may enter a collimator lens 100 and emerge substantially collimated. The collimated light may pass through a half wave plate 101 and enter an assembly 102 that includes a pair of prisms that may expand the beam further along the wide axis of the ellipse and displace it somewhat in the same direction. Half wave plate 101 may be freely rotated so that the linearly polarized light from the laser diode 96 will have the proper polarization direction upon entering the acousto-optic deflector 130 since such acousto-optic deflectors may be polarization sensitive. The light exiting the prism pair may continue on to the acousto-optic deflector 130. The acousto-optic deflector may divide the laser beam into a zero ('0') order light beam 108, which may be ignored, and a first ('1') order light beam 106, which may be directed towards the object 8.

The acousto-optic deflector 130 may be driven by an RF voltage whose frequency varies in a sawtooth manner via Acousto-Optic (AO) Control 135. Thus, the first order output light beam 106 may be deflected over an angular range at a constant rate and then rapidly returned to its starting point. The incoming light beam 103 input to the acousto-optic deflector 130 may be adjusted to enter a crystal 133 at the Bragg angle so that most of the light energy goes into the first order beam 106 and very little energy into the zero order beam 108 which is blocked by baffle 109 to prevent it from passing through the optical chain.

Because the acousto-optic deflection changes as a function of the wavelength of the input beam, it may be important for the beam entering it to have a single pure wavelength. If this cannot be achieved and a narrow band of wavelengths is present, a specially selected prism can be positioned between the beam expander 102 and the acousto-optic deflector 130 to partially cancel out the effects of the multiple wavelengths. This may be done by selecting a prism whose index of refraction is wavelength sensitive such that the prism's output angle versus wavelength varies oppositely with that of the acousto-optic deflector 130 at its center position 15. If the acousto-optic deflector would be perfect, the light beam leaving the deflector 130 would be perfectly collimated, as when it entered. In this case, the beam would travel to cylindrical lens 110 and 114, which may focus the beam to a target point 20. Each lens may take care of the beam focusing in one plane only. As the beam is swept due to the RF input to the acousto-optic deflector 130, the beam may move from 20A to 20B and return. Lens 110 may be mounted approximately one focal length away from acousto-optic deflector 130 and one focal length away from the target. Accordingly, lens 110 may act as a telecentric lens. Since the acousto-optic deflector 130 is at the focus of lens 110, the swept beam 106 may always leave the lens parallel to its axis regardless of its angle of arrival. Similarly, because the swept beam 106 may be substantially collimated, it may always focus at the target point 20. Lens 114 may be located a distance, e.g., one focal length, away from the target point 20. The parallel rays striking lens 114 may focus at 20, 20A or 20B, according to where on the lens surface they are input.

The beam 106 exiting from the acousto-optic deflector 130 might not be perfectly collimated because the RF voltage into it may be rapidly varying in frequency in a linear manner as a function of time. This may cause the acousto-optic deflector 130 to act as though it incorporated a weak cylindrical lens. This may be corrected with the addition of a cylindrical correcting lens of the opposite curvature or by adjusting the position of lens 110 slightly to compensate for the presence of the additional weak cylindrical power induced by the acousto-optic deflector 130.

However, the combination, according to exemplary embodiments of the present invention, of providing a small projected spot (small spot size), high speed scanning which may increase the cylindrical lens effect, and the use of a shear wave acousto-optic deflector 130 to meet a wide scan requirement, may induce other exaggerated aberrations and distortions or increased sensitivity to them, i.e., more exaggerated than those of conventional triangulation systems that implement longer wavelengths (and therefore a larger spot size), into the output waveform of the scanned beam 106 due to the "walkoff" phenomena as is explained in U.S. Pat. No. 5,517, 349, issued to Sandstrom, entitled "Process and a Device for Error Correction in Acousto-Optic Deflection of Light Beams, Particularly of Laser Light." Due to "walkoff," the scanned beam's source may appear to be located at points along a tilted line that correspond to sampling points across the exit face of the acousto-optic deflector crystal 133. Although use of the shorter wavelength may allow for reduction in the spot size, while maintaining or even increasing the F#, i.e., the aperture not being enlarged, so that reducing the laser wavelength from IR to a visible wavelength, e.g., to blue or violet, may be considered to mitigate the problem of aberrations caused by enlargement of aperture, nevertheless reduction in the spot size, irrespective of aperture size, may increase the aberrations.

Therefore, in an example embodiment of the present invention, the lens 110 may be tilted to reduce the distortion by focusing the virtual points that lie along a tilted line to be focused onto the swept line of 20A to 20B at the target object 8. In an alternative example embodiment, a prism wavefront corrector 118 may be inserted between the acousto-optic deflector 130 and the cylindrical lens 110 to correct for the "walkoff."

Figure 3:
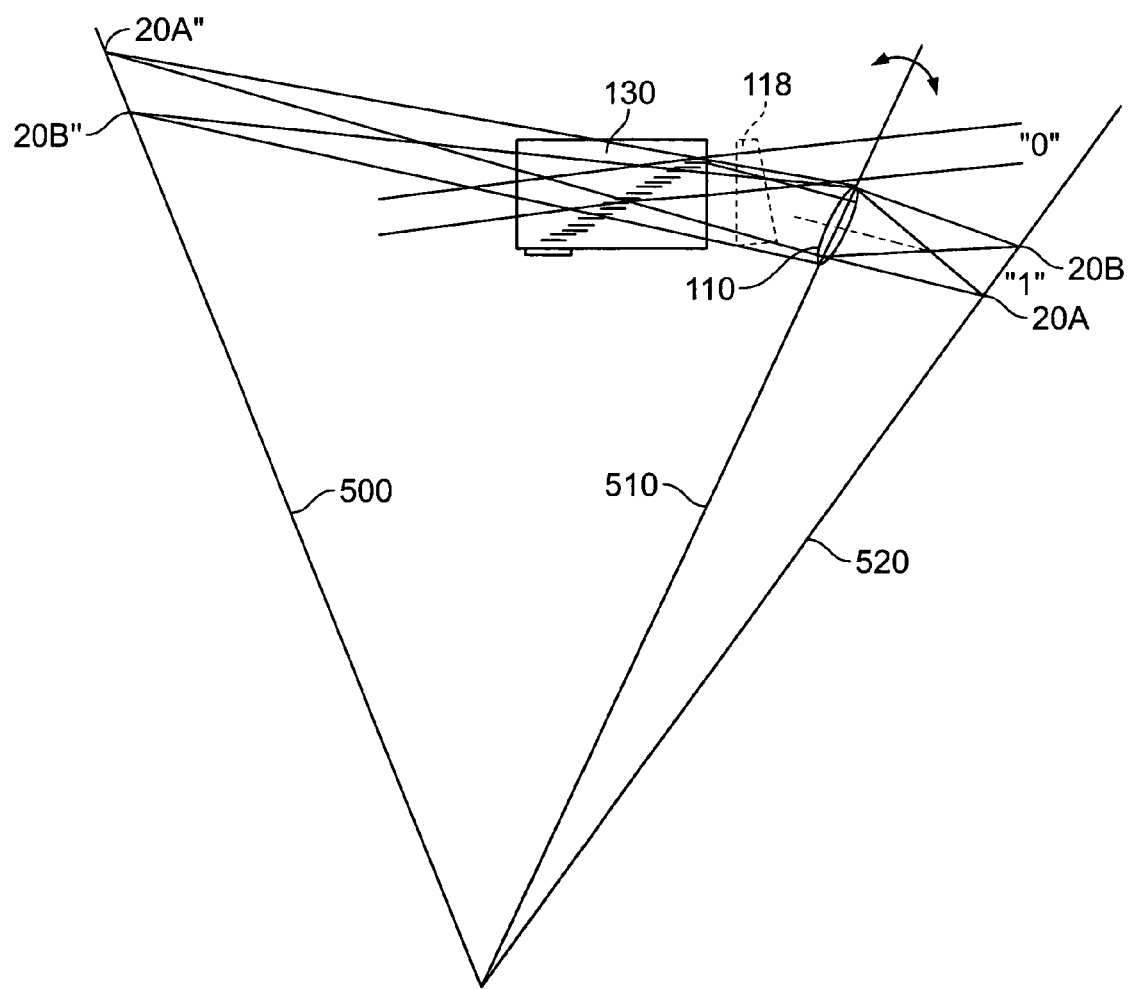
FIG. 3 is a more detailed schematic representation of the operation of acousto-optic deflector of FIG. 2 within the laser scanning portion and the use of a tilted lens or a prism to correct aberrations, according to an example embodiment of the present invention.

FIG. 3 illustrates the use of a tilted lens 110 to correct for the "walkoff" effect. Because of "walkoff," laser light passing through the acousto-optic deflector 130 may appear to emanate from virtual points 20A" and 20B" which lie on a line 500 that is skewed with respect to where the laser spots 20A and 20B are to be focused—along line 520, which corresponds to scan axis 19 in FIG. 1. By properly tilting lens 110 to lie on line 510, both points 20A and 20B and any points between them may be kept in focus via the aforementioned Scheimpflug condition. In an alternative example embodiment, a prism 118 (shown with dashed lines) may be used. With prism 118 in place, proper focus can be achieved with lens 110 parallel to line 520 so that its axis is perpendicular to line 520.

In one example embodiment of the present invention, an implemented spot size may be of a conventional size, but may be formed by implementing a shorter than conventional wavelength offset by an increased F# (smaller aperture). In this way, the triangulation system may be enhanced by reduction in the aberrations, since the spot size is not reduced and the aperture is reduced. However, reduction in the wavelength may cause other problems further discussed below, which may be corrected, irrespective of whether spot size is also reduced, according to an exemplary embodiment of the present invention, as explained below with respect to FIGS. 4 and 5.

On the way to focusing at the target 20, the laser beam 15 may be passed through a quarter wave plate 113 to convert the linearly polarized laser light into circularly or elliptically polarized light, that when used with a circularly or elliptically polarized filter at the light detection unit 50 (FIG. 1) can help eliminate unwanted secondary reflections from the target area, as outlined in U.S. Pat. No. 6,028,671, issued to Svetkoff et al. and entitled "Method and system for suppressing unwanted reflections in an optical system." Unwanted secondary reflections might be caused by light reflected from the target object 8 being reflected off of another object or other feature on the object before being reflected back to the light detection unit 50. The filter can be included to allow only directly reflected light to pass to the light detection unit 50, while preventing the secondary reflections from passing on to the light detection unit 50. This uses the property that circularly polarized light has its polarization rotated upon reflection. Thus, in an example embodiment of the present invention, a circularly polarized filter that passes light that has been reflected once from a shiny target (and has its polarization reversed) and that rejects light that has been twice reflected (leaving the polarization unchanged) may be placed in from of the light detecting elements.

Figure 4:
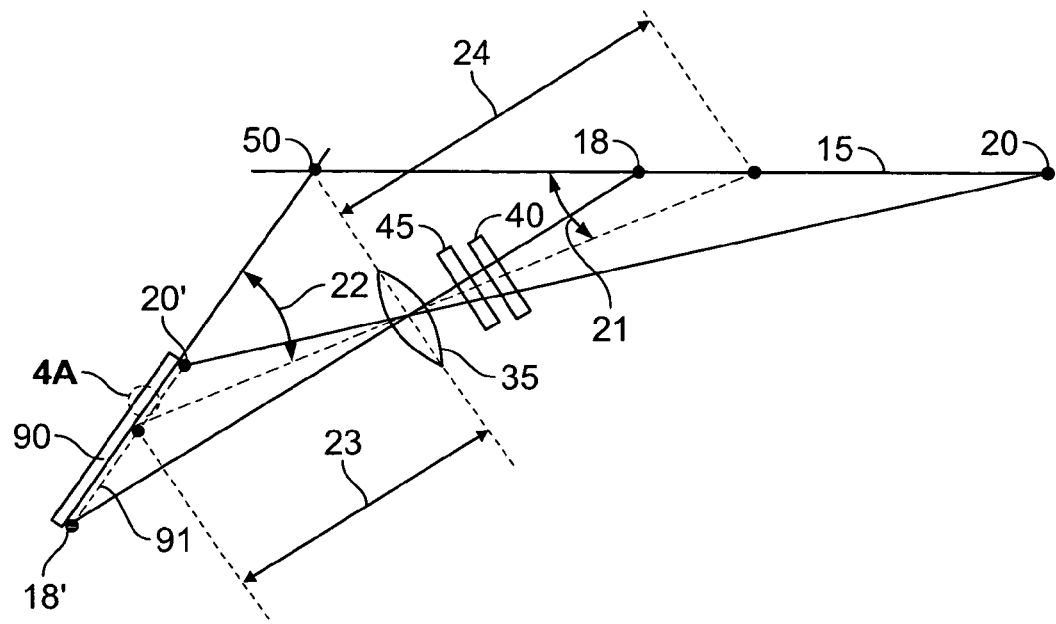
FIG. 4 is a schematic representation of the detection unit of FIG. 1 with elements added for reducing reflections, according to an example embodiment of the present invention.
Figure 4A:
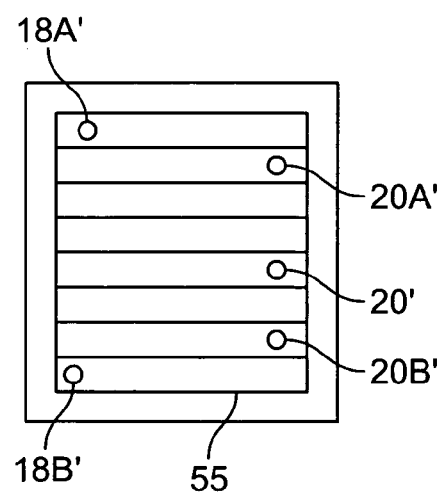
FIG. 4A is a schematic view of a PSD detector array of FIG. 4 and the location of images on the PSD that correspond to positions on the surface of the object generated by various locations of the scanning beam and depths on the object.

FIG. 4 shows in schematic form an exemplary detection unit 50, according to an example embodiment of the present invention. Lens 35 may image the portion of the laser beam in the target area corresponding to its depth of field between points 18 and 20 onto detecting element 90. The detecting element 90 is shown as a PSD, but may, in alternative exemplary embodiments, include other imaging devices, such as a CCD or CMOS imaging device. FIG. 4A shows a plan view of the detecting element 90 which may incorporate a multi-segment PSD. In this type of PSD, a single large PSD may be divided into multiple smaller PSDs, such as PSD segment 55 that may be used selectively as outlined in U.S. Pat. No. 5,554,858, issued to Costa et al., entitled "Segmented Position Sensing Detector for Reducing Non-Uniformly Distributed Stray Light from a Spot Image," the disclosure of which is incorporated herein in its entirety by reference thereto. The PSDs may be tightly packed so that the separation between them is only a small fraction of their width. In normal use, the particular segments used are the ones that correspond most closely to the current position of the laser beam. As the laser beam 15 scans from its 15A position to its 15B position (FIG. 1), there may appear corresponding spots, 18A, 20A, 18B, or 20B, on the target, depending upon the depth of the target. FIG. 4A shows the image of the preceding four spots on the PSD 90 as 18A', 20A', 18B', and 20B', respectively. The image points form a trapezoid on the PSD 90 in FIG. 4A because of perspective distortion. The 18A or 20A spot on the target will image to a different PSD segment than the 18B or 20B spot on the target. When the laser beam is in position 15A, only the output on the segment(s) corresponding to the segment(s) on which images 18A and 20A lay need be used by the computer analyzing signals. When there is uncertainty in the laser beam 106 position, multiple segments that are centered on the best estimate of the current position may be read out.

Figure 5:
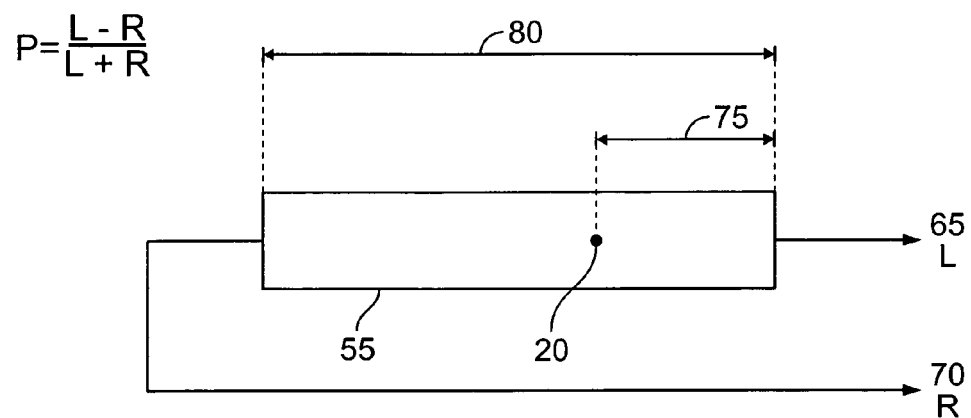
FIG. 5 illustrates in more detail the operation of a PSD of FIGS. 1 and 4.

FIG. 5 is a schematic of a single PSD segment 55 showing its two current outputs, output 70 and output 65. Both outputs may be sent into circuits that change the currents into voltages. The voltages may be sent to analog to digital converters (A/Ds). The digital outputs may be sent to a computer that uses the values to compute the distance 75 along the PSD's length 80 where the light spot 20 lies from the formula:

[length 80]*([output 65]-[output 75])/([output 65]+
[distance 75])    (eq. 11).

The factor ([output 65]-[output 75])/([output 65]+[distance 75]) is a ratio and so it is independent of the gain present in processing the two outputs as long as it is the same for both. From the value of distance 75 and the known geometry, the depth of the intersection of the laser beam 15 with the target object 8 can be computed. Alternatively, values can be precomputed and the system calibrated so that there is a direct depth look up value associated with any position along any PSD segment 55.

The optical axis of the lens 35 forms an angle 21 with the laser beam 106 in its central position corresponding to point 20 in the target area. The PSD 90 may lie in a plane that forms an angle 22 with the optical axis of the lens 35. For the points between 18A, 18, 18B, 20A, 20 and 20B to be in focus on the PSD, it may be required for the plane formed by the aperture of lens 35, the plane formed by the swept laser beam 106, and the plane formed by the surface of the detecting element 90 to all meet in a common line which is shown as point 50 in FIG. 4. This condition (as outlined for laser triangulation in U.S. Pat. No. 6,031,225, issued to Stern et al., entitled "System and Method for Selective Scanning of an Object or Pattern Including Scan Correction," in U.S. Pat. No. 7,075,662, issued to Hallerman et al. and entitled "Method for three-dimensional inspection using patterned light projection," and in U.S. Pat. Nos. 6,262,803 and 6,144,453, each of which issued to Hallerman et al. and is entitled "System and method for three-dimensional inspection using patterned light projection," the disclosures of all of which are incorporated herein in their entirety by reference thereto) is also known in the literature as the Scheimpflug condition and enforces the relationship between angles 21, 22, and the distances 23 and 24 which correspond to the magnification between the laser beam and its image on the PSD. This relationship may be expressed by the equation:

Angle 22=ArcTan((Tan[Angle 21])*[distance 24]/
[distance 23])    (eq. 12).

In an example embodiment of the present invention, a quarter wave plate 40 and a polarizer 41 may be optionally provided (e.g., when quarter wave plate 113 is used in the laser scanning assembly 4) as the above described filter for reducing secondary reflections via elliptical or circular polarization of the scanned laser beam 106.

Conventional triangulation systems include a PSD supplied by the manufacturer with an anti reflection (AR) coating 91 that is optimized for the wavelength to be used and a zero degree angle of incidence, i.e., zero degrees between the incident ray and the normal to the PSD's surface, which would correspond to a 90 degree angle 22, which is not the case in the example embodiment. That is, heretofore, in triangulation systems, the PSD 90 has been used with this coating even when the actual average angle of incidence ranges between 60 and 70 degrees for a 30 degree to 20 degree sensor offset angle 21 and a magnification of unity. The conventionally used coating, which is adjusted to the "phantom" zero degree incidence (it is phantom because the angle of incidence is actually more than zero degrees as explained) is a single layer coating deposited on the silicon. The coating works by transforming or "matching" the refractive index of the silicon to that of air where light enters the coating.

An example embodiment of the present invention may compensate for a 60 to 70 degree angle of incidence, which may otherwise cause significant errors in the light detection unit 50 because of lack of absorption of the received light and because the light reflected from the PSD element 90 may be re-reflected onto the light detection unit 50 via reflections from nearby objects such as wire bonds or other objects in the PSD package or adjacent to it, these being caused or exacerbated due to implementation of the shorter wavelengths.

For compensation for the 60 to 70 degree angle of incidence, a coating more complex than the conventional coating may be applied to the detecting element 90. When implementing a short wavelength, it may be required for the range of angles not to be ignored. In an example embodiment of the present invention, to satisfy a large range of angles, a more complex coating 91 with multiple layers may be provided to satisfy the interference relationship between the layers that facilitate the matching. The coating 91 may be of at least two materials deposited in at least two layers (each material in its own layer) and may be optimized for a particular polarization of light striking it. One form of the multilayer coating 91 may be a two layer coating 91 in which the thickness of each the two individual layers is adjusted for the material being coated, the polarization of the light, and the angle of incidence, given the coating materials used, one layer's material generally having a high index of refraction and the other layer's material having a low index of refraction. One of the improvements that may be required for the performance needed in the current invention is to employ PSDs that have been optimized for the steep angle of incidence at the wavelength and particular polarization employed, if any. That is, the coating 91 may be of materials and layers selected to match the optical index of refraction of the PSD silicon to the optical index of refraction of air, i.e., the coating 91 may cause the index of refraction of the PSD 90 to appear to be the same as that of the index of refraction for air, for the range of angles and wavelength of the light entering the coating.

The range of angles can be determined by inspection in FIG. 4. If lines from all around lens 35 are drawn to points 20' and 18' and points therebetween on the detector, their angles with respect to the detector surface encompass the entire range required to be matched by the AR coating 91. The polarization used is determined by the direction of the polarizer 45 in FIG. 4. One example polarizer 45 may be of the type manufactured by Coming Glass from a material commercially known as Polacor. To get the optimum performance with the Anti Reflection (AR) coatings used, the polarization may be set for "P." "P" represents the condition in which the light vibrates in the incidence plane (as opposed to, e.g., perpendicular to it). The incidence plane is shown in FIG. 4 as the triangle formed by point 18', point 20', and the point at the center of lens 35. The polarizer 45 may be rotated so that the electrical oscillation of the reflected light lies in the plane of incidence. When using circular or elliptical polarization, it may be required for the quarter wave plate 40 to be set to have its fast axis 45 degrees away from the polarizer's axis in the proper direction to pass the incoming light from the reflected laser beam 15 according to whether light is rotating clockwise or counter clockwise (the different rotations depending on whether the light was reflected once, or twice by indirect reflection from a surrounding object, as explained above).

When the AR coating 91 is optimal for the wavelength, angle of incidence, and polarization, the maximum amount of energy from laser light beam 106 that is reflected by the target 8 and focused by lens 35 may thereby penetrate the surface of the PSD 90 to generate an output. This may improve the triangulation system's signal to noise ratio, and may avoid reflections from the PSD 90 surface that may be re-reflected by nearby objects onto the PSD 90 surface. Otherwise, since this extra light is not located at the image of the projected laser spot 20 on PSD 90, it would offset the ratio from which depth is determined and so yield an incorrect depth value. This problem may be avoided and the systems signal to noise ratio enhanced when the optimized AR coating 91 having two or more layers with differing materials is used.

Figure 7:
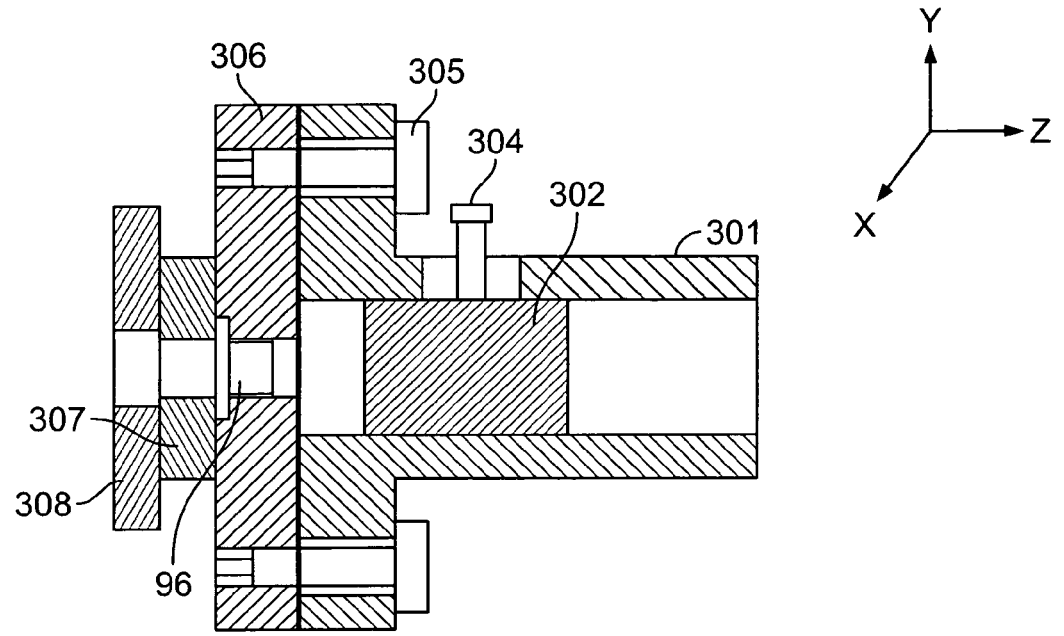
FIG. 7 schematically illustrates a conventional positioning assembly for a laser diode and a collimating device.

FIG. 7 schematically illustrates a conventional positioning assembly for positioning the laser diode 96 and the collimator lens 100 with respect to each other. The positioning assembly includes a collimator tube 301, a collimator lens assembly 302, a laser diode holder 306 for holding the laser diode 96, a collimator lens adjustment/retaining screw 304, final adjustment retaining elements 305, an LD cooler 307, and an LD heat-sink 308.

The conventional positioning assembly does not guarantee orthogonality of the laser beam, and does not provide for well controlled positioning of the laser diode 96 with respect to the collimator lens of the collimator lens assembly 302.

When adjusting the relative positions of the laser diode 96 and the collimator lens in the axial or lateral directions, there are no precision mechanisms that would allow controlled movements in an independent manner along each of the X, Y, and, Z axes. In fact, the positioning elements are not ones that allow for precise positioning of the laser diode 96 with respect to the collimator lens in any of the X, Y, and Z axes.

For adjusting the relative positions of the laser diode 96 and the collimator lens in the conventional assembly, sides of the laser diode holder 306 can be tapped, utilizing gaps between the final adjustment retaining elements 305 and the corresponding holes in the collimator tube 301.

For the conventional positioning assembly, to bring the laser beam axis into the desired direction, an adjustment fixture with targets and a laser beam profile measuring device can be used to determine what the correct position is. To then approximately implement the determined X, Y, and Z positions of the laser diode 96 with respect to the collimator lens assembly 302, the final adjustment retaining elements 305 and the collimator lens adjustment/retaining screw 304 are used. However, the alignment achieved is generally not optimum due to the lack of independently variable precision axis adjustments.

In an example embodiment of the present invention, a positioning assembly may be provided for precise and independent positioning of the laser diode with respect to the collimator lens 100 in each of the X, Y, and Z axes. In one exemplary embodiment, the preciseness may be to within 2.2 microns in each of the X and Y directions, and to within 0.75 microns in the Z direction.

Figure 8:
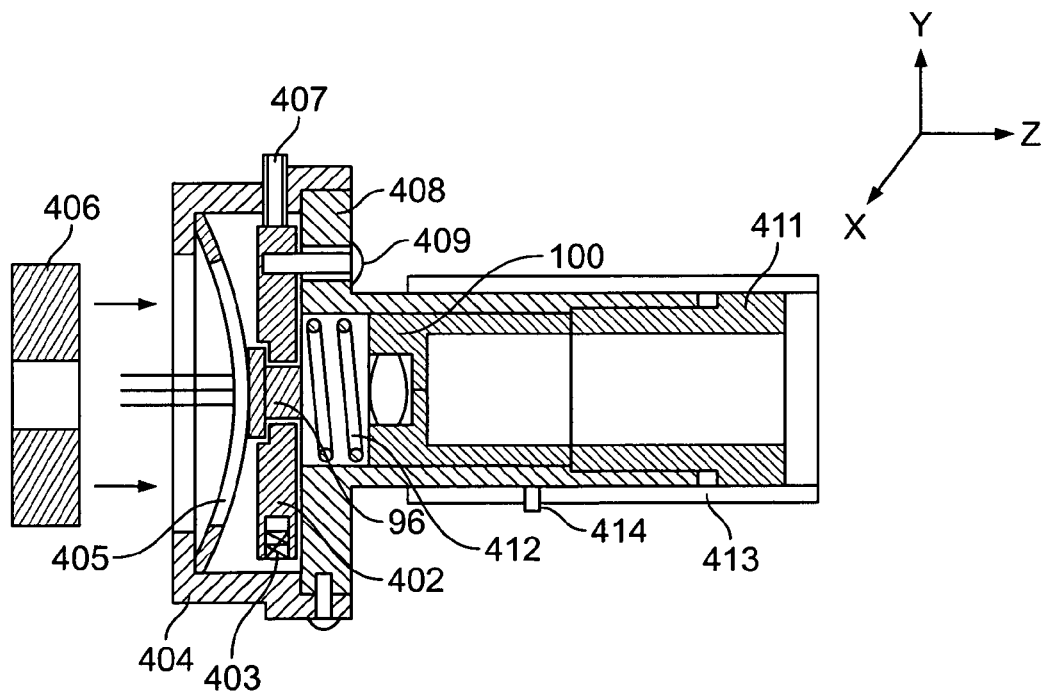
FIG. 8 schematically illustrates a positioning assembly for a laser diode and a collimating device of FIG. 2, according to an example embodiment of the present invention.

FIG. 8 schematically illustrates a positioning assembly for positioning the laser diode 96 and the collimator lens 100 with respect to each other, according to an example embodiment of the present invention. The positioning assembly may include a laser diode holder plate 402 for holding the laser diode 96, a reaction spring or reaction screw 403 in both of the X and Y directions (shown in FIG. 8 only in the Y direction), a module cap 404, a back spring 405, a TE cooler (thermoelectric device used for cooling or heating purposes) 406, adjustment screws 407 in both of the X and Y directions (shown in FIG. 8 only in the Y direction), a collimator adjustment tube 408 in which the collimator lens 100 may be located, adjustment retaining screws 409, a micro-adjusting nut 411, a back-up spring 412, a protection sleeve 413, and a retaining set screw 414.

Laser diode 96 may be positioned within laser diode holder plate 402. The plate 402 may be in communication with the back surface of the collimator adjustment tube 408 prior to tightening of adjustment retaining screws 409. Back spring 405 in module cap 404 may generate axial force in the Z direction, thereby ensuring that the plate 402 is placed up against the collimator adjustment tube 408 so that adjusting the micro-adjusting nut 411 (described below) precisely adjusts the relative position of the laser diode 96 and the collimator lens 100 in the Z direction.

Precise adjustment of laser diode holder plate 402 (with laser diode 96) in the X and Y directions may be provided by X and Y adjustment screws 407 and corresponding reaction springs 403. The biasing by the springs 403 in a direction opposed to the tightening direction of the adjustment screws 407 may allow for increased precision in the positioning. In an alternative embodiment, instead of reaction springs 403, reaction screws 403 (not shown) may be provided. With respect to the reaction screws 403, by incorporating such opposing screws for each adjustment screw 407, loosening and tightening of the opposing screws may be performed repeatedly as required until the position of the laser diode holder plate is in the correct position.

Being completely independent and orthogonal to each other by design, the adjustments of the relative positions of the laser diode 96 and the collimator lens 100 in the X and Y directions may be performed in a reliable and precise manner.

In the Z direction, the configuration illustrated in FIG. 8 may provide for adjustment of the relative positions of the laser diode 96 and the collimator lens 100 via micro-adjusting nut 411 and back-up spring 412, which may be at least partially positioned within collimator adjustment tube 408, as shown in FIG. 8.

Micro-adjusting nut 411 may engage collimator adjustment tube 408 via a precision thread. While being turned, micro-adjusting nut 411, working against back-up spring 412, may force collimator lens 100 to move in the Z direction. This movement may be controlled and independent from any other directional adjustments.

After all adjustments are completed, tightening adjustment retaining screws 409 may secure the X and Y spatial position of laser diode 96 relative to collimator lens 100.

Protection sleeve 413 and retaining setscrew 414 (for securing the protection sleeve 413 in place) may prevent accidental rotation of the micro-adjusting nut 411, which can disturb the Z axis alignment. Protection sleeve 413 may restrict access to micro-adjusting nut 411. Protection sleeve 413 and retaining setscrew 414 may be positioned in place after the final adjustments, in the Z direction particularly, are completed.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings and the specification. For example, the semiconductor industry is but one example of where embodiment of the present invention may be applied.

What is claimed is:

1. A method for detecting features of a target object using a triangulation system, comprising:
   producing radiation having a wavelength shorter than that of infrared radiation;
   focusing the radiation on an object;
   providing a radiation detecting element having an optical index of refraction that is matched to an optical index of refraction of air and which is further matched for at least one of a range of angles at which a radiation reflected from the object approaches the radiation detecting element and for the wavelength of the radiation;
   detecting radiation reflected from the object due to impingement of the produced radiation on the object; and
   based on the detecting, determining at least one dimension of at least one feature of the object;
   wherein the produced radiation is a laser beam.

2. The method of claim 1, wherein the radiation detecting element is a light detecting element.

3. The method of claim 1, wherein the radiation detecting element includes silicon material.

4. The method of claim 1, wherein the matching is performed by coating the radiation detecting element with a coating that includes at least one of (a) at least two materials and (b) at least two layers.

5. The method of claim 4, wherein the coating is matched to a polarization of the radiation.

6. The method of claim 5, wherein the polarization is caused by passing of the reflected radiation through a filter that prevents indirectly reflected radiation from passing through the filter to the light detecting element.

7. The method of claim 1, further comprising:
   incorporating in the triangulation system a corrective component adapted to reduce aberrations that cause field tilt and curvature.

8. The method of claim 7, wherein the corrective component includes at least one of tilted projection optics and a prism wavefront corrector.

9. The method of claim 1, wherein the impinging radiation produces a spot size sufficiently small so as to result in: (a) aberrations that cause a field tilt and curvature, which skews analysis by the triangulation system; and (b) a sensitivity to such aberrations, the method further comprising:
   incorporating in the triangulation system a component adapted to reduce the aberrations.

10. The method of claim 9, wherein the component includes at least one of tilted projection optics and a prism wavefront corrector.

11. The method of claim 1, further comprising:
   positioning a source of the produced radiation in at least one of three dimensions; and
   securing the radiation source in place.

12. The method of claim 11, wherein:
the radiation source is a laser diode; and
the laser diode is positioned with respect to a collimator lens independently in each of the three dimensions.

13. The method of claim 12, wherein a preciseness of the positioning in each of the three dimensions is at least to within 2.2 microns.

14. The method of claim 13, wherein the preciseness of the positioning in at least one of the three dimensions is at least to within 0.75 microns.

15. The method of claim 12, wherein the positioning of the laser diode in each of the three dimensions is performed by screwing a corresponding threaded part in a direction that is opposed to a biasing direction of a corresponding biasing element.

16. The method of claim 15, wherein:
a first one of the threaded parts is threadably inserted into a collimator adjustment tube for moving the collimator lens against a first one of the biasing elements along the collimator lens' axis; and
each of a second one and a third one of the threaded parts is threadably inserted into a laser diode holder plate for moving the laser diode transverse to the movement of the collimator lens and against corresponding biasing elements, the two transverse movements being orthogonal to each other.

17. The method of claim 16, further comprising:
fixing a protection sleeve over the first threaded part after completion of the movement of the collimator lens along the collimator lens' axis in a manner that guards against inadvertent movement of the collimator lens along the collimator lens' axis.

18. The method of claim 12, wherein the positioning of the laser diode in each of at least two of the three dimensions is performed by repeated screwing and loosening of each of a pair of opposing threaded parts corresponding to the respective dimension.

19. The method of claim 1, wherein the wavelength is shorter than 830 nm.

20. The method of claim 1, wherein the wavelength is centered in a range of 380 to 660 nm.

21. The method of claim 1, wherein the wavelength is centered in a range of 380 to 570 nm.

22. The method of claim 1, wherein the wavelength is centered at 535 nm.

23. The method of claim 1, wherein the wavelength corresponds to that of visible light.

24. The method of claim 1, wherein the wavelength corresponds to at least one of red light, green light, blue light, and violet light.

25. The method of claim 1, wherein the wavelength is shorter than that of visible light.

26. A scanning laser beam triangulation system, comprising:
a laser diode that produces a laser beam having a wavelength that at least one of:
(a) is centered in a range of 380 to 570 nm;
(b) corresponds to one of green light, blue light, and violet light; and
(c) is shorter than that of visible light;
an optics assembly adapted for focusing the laser beam on an object and including:
a collimator lens configured to collimate the laser beam;
an acousto-optic deflector configured to deflect the laser beam; and
at least one of tilted projection optics and a prism wavefront corrector;
a positioning assembly adapted for fixing the laser diode and the collimator lens in a relative position;
a light detection unit configured to detect light reflected from the object due to impingement of the laser beam on the object and including a silicon detecting element;
a coating positioned on the silicon detecting element and adapted to match an optical index of refraction of the light detecting element to an optical index of refraction of air, the matching being customized for a range of oblique angles at which the light reflected from the object is able to approach the light detecting element and for the wavelength of the laser beam; and
a processor configured to determine, based on the detected light, at least one dimension of at least one feature of the object.

27. The system of claim 26, wherein the coating includes two layers made of two different materials, a first one of the materials having a first index of refraction and a second one of the materials having a second index of refraction lower than the first index of refraction.

28. The system of claim 27, wherein:
the laser beam produces a spot size that is smaller than 35 microns and that results in at least one of (a) aberrations that cause a field tilt and curvature and (b) a sensitivity to such aberrations, which skews analysis by the processor; and
the at least one of the tilted projection optics and the prism wavefront corrector is adapted to reduce the aberrations.

29. The system of claim 28, wherein a depth of field of the laser beam is at least 1.5 mm.

30. The system of claim 29, wherein the positioning assembly includes:
a laser diode holder plate adapted for holding the laser diode;
a collimator adjustment tube adapted for holding the collimator lens;
for each of three dimensions, at least one corresponding positioning element, the positioning elements adapted for positioning of the laser diode with respect to the collimator lens in each of the three dimensions independently, a preciseness of the positioning in the dimension along the collimator lens' axis being at least to within 0.75 microns, and the preciseness of the positioning in the other two dimensions being to within 2.2 microns;
a protection sleeve; and
a biasing element for biasing the laser diode holder plate in a direction towards the collimator lens.

31. The system of claim 30, wherein:
the at least one corresponding positioning element of each of the three dimensions includes a pair of opposing parts; and
one of:
(I) for each of the three dimensions, the respective pair of opposing parts includes a threaded part and a biasing element, the positioning in the respective dimension being performed by screwing the threaded part of the respective pair in a direction that is opposed to a biasing direction of the biasing element of the respective pair; and
(II) the pair of opposing parts of a first dimension includes a threaded part and a biasing element, the positioning in the first dimension being performed by screwing the threaded part in a direction that is opposed to a biasing direction of the biasing element, and, for each of the remaining of the three dimensions, the pair of opposing parts is a pair of opposing threaded parts and the positioning is performed by repeated screwing and loosening of the respective pair of opposing threaded parts.

32. The system of claim 31, wherein:

the first dimension is along the collimator lens' axis;

the threaded part of the first dimension is configured for threadable insertion into the collimator adjustment tube for moving the collimator lens against the biasing element of the first dimension; and each of a threaded part of a second one of the dimensions and a threaded part of a third one of the dimensions is configured for threadable insertion into the laser diode holder plate for moving the laser diode transverse to the movement of the collimator lens and against corresponding opposing parts, the two transverse movements being orthogonal to each other.

33. The system of claim 32, wherein the protection sleeve is configured to be coupled to the collimator adjustment tube, to cover the threaded part of the first dimension after completion of the movement of the collimator lens along the collimator lens' axis, and, when covering the threaded part of the first dimension, to guard against inadvertent movement of the collimator lens along the collimator lens' axis.

* * * * *

UNITED STATES PATENT AND TRADEMARK OFFICE
CERTIFICATE OF CORRECTION

PATENT NO.      : 7,616,328 B2                              Page 1 of 1
APPLICATION NO. : 11/936671
DATED           : November 10, 2009
INVENTOR(S)     : Howard Stern et al.

It is certified that error appears in the above-identified patent and that said Letters Patent is hereby corrected as shown below:

Column 2, line 48 (Approx.), delete "electromechanical" and insert in place thereof --electro-mechanical--.

Column 19, line 64, delete "Coming Glass" and insert in place thereof --Corning Glass--.

Column 19, line 65, delete "Polacor" and insert in place thereof --Polarcor--.

Column 21, line 12 (Approx.), delete "(thermoelectric" and insert in place thereof --(thermo-electric--.

Signed and Sealed this

Nineteenth Day of January, 2010

David J. Kappos
*Director of the United States Patent and Trademark Office*